Nov. 22, 1955    W. R. EAMES    2,724,335
PUMPING UNIT WITH FLOW DIRECTOR
Filed Dec. 14, 1951    6 Sheets-Sheet 1

INVENTOR.
WALTER R. EAMES
BY Hudson, Boughton,
Williams, David & Hoffmann
ATTORNEYS Nov. 22, 1955    W. R. EAMES    2,724,335
PUMPING UNIT WITH FLOW DIRECTOR
Filed Dec. 14, 1951    6 Sheets-Sheet 2

INVENTOR.
WALTER R. EAMES
BY Hudson, Doughton,
Williams, David & Hoffmann.
ATTORNEYS

*INVENTOR.*
WALTER R. EAMES
BY Hudson, Boughton,
Williams, David & Hoffmann
ATTORNEYS

INVENTOR.
WALTER R. EAMES

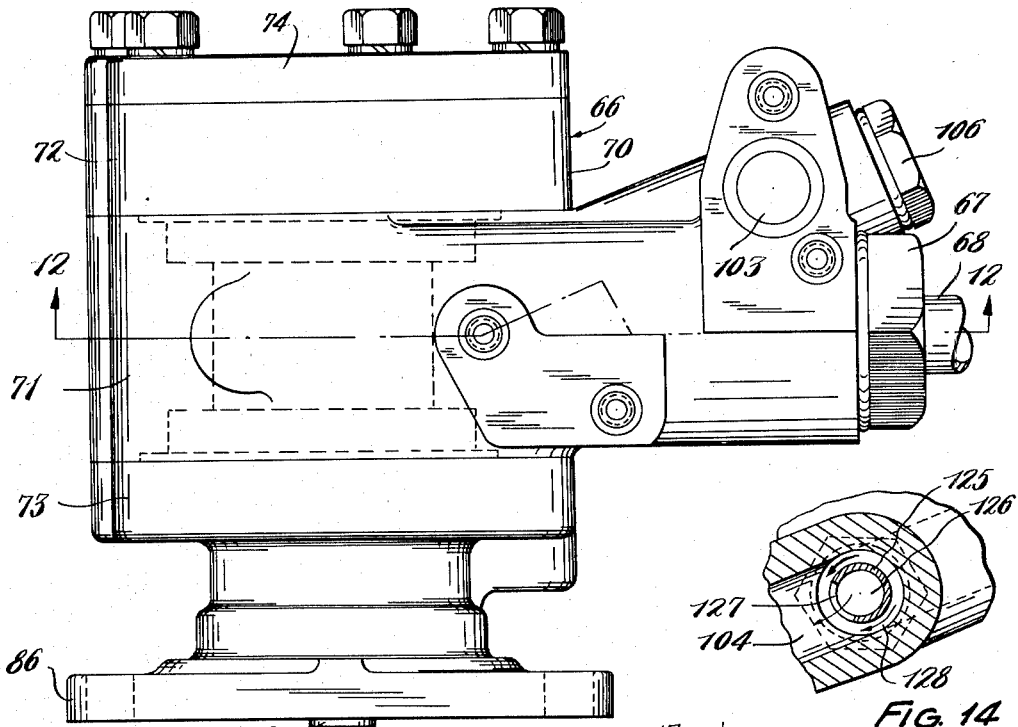
Fig. 10
Fig. 14
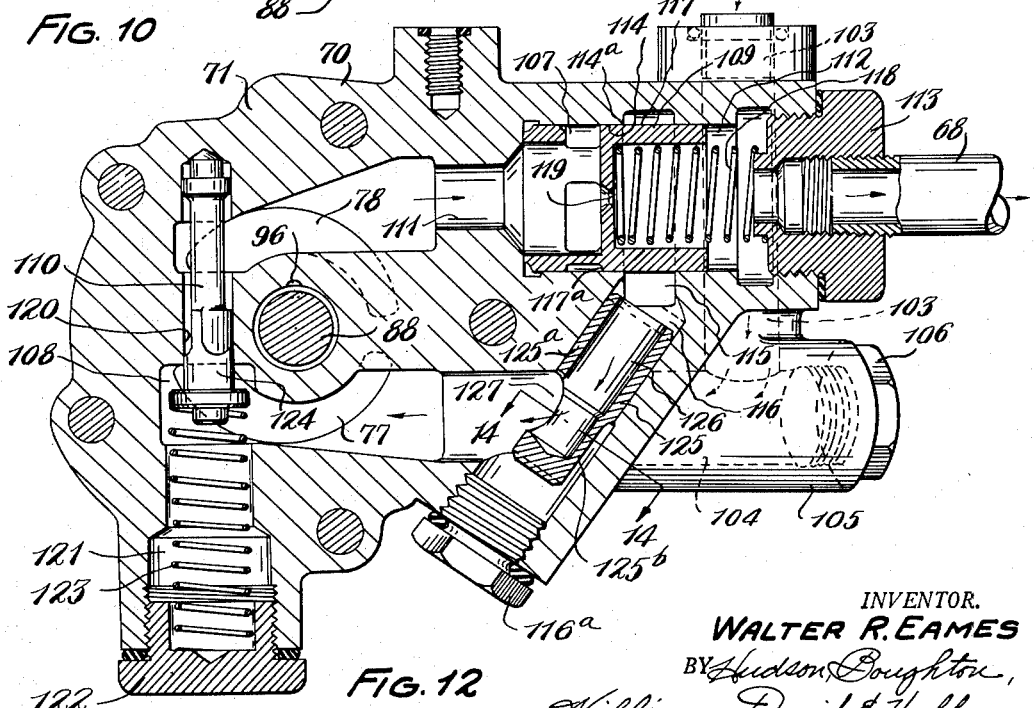
Fig. 12
INVENTOR.
WALTER R. EAMES
ATTORNEYS Nov. 22, 1955 W. R. EAMES 2,724,335
PUMPING UNIT WITH FLOW DIRECTOR
Filed Dec. 14, 1951 6 Sheets-Sheet 6

INVENTOR.
WALTER R. EAMES
BY Hudson, Boughton,
Williams, David & Hoffmann.
ATTORNEYS

United States Patent Office 2,724,335
Patented Nov. 22, 1955

2,724,335

PUMPING UNIT WITH FLOW DIRECTOR

Walter R. Eames, Hazel Park, Mich., assignor to Eaton Manufacturing Company, Cleveland, Ohio, a corporation of Ohio Application December 14, 1951, Serial No. 261,654

4 Claims. (Cl. 103—4)

This invention relates to rotary pumps, and particularly, to rotary pumps of the positive displacement meshing gear type and to pumping units embodying rotary pumps of this kind.

When a rotary pump of this type is used to supply hydraulic actuating fluid to an auxiliary or accessory device of a motor vehicle, such as to a hydraulic power steering device, the pump is usually driven from the vehicle power plant and, hence, is subject to operation at widely varying speeds. The output capacity of the pump must be sufficient to meet the requirements of the auxiliary device during low speed operation of the vehicle, and accordingly, the pressure and volume values of the pump delivery during high speed operation of the vehicle are usually considerably in excess of the requirements of the auxiliary device.

The auxiliary device is usually contained in a closed-loop external circuit through which fluid is forced by the pump and the excess fluid is by-passed from the discharge side of the pump to the intake side thereof. The present invention is particularly concerned with the by-passing of this excess fluid and, as one of its objects, aims to provide a rotary pump having novel flow directing means by which the by-passed fluid is returned to the intake side of the pump with minimum turbulence and noise.

Another object is to provide a rotary pump having novel flow directing means by which the by-passed fluid is returned to the intake side in a manner such that the velocity and direction of the stream of by-passed fluid will assist the flow of intake fluid toward the intake port of the pump and such that the energy of the high velocity fluid will be utilized in increasing the pressure head of the fluid in the intake at points downstream from the junction point of the stream of by-passed fluid with the stream of intake fluid.

A further object is to provide a novel flow director for a rotary pump of the character mentioned and which flow director is preferably in the form of a hollow insert mounted in the pump housing and includes a portion projecting into the intake passage and provided with a discharge opening or nozzle facing toward the intake port.

Still another object is to provide a pumping unit comprising a rotary pump having by-pass valve means and a reservoir adapted to supply fluid to the intake means of the pump, and in which a novel flow directing means receives the by-passed fluid and directs the same into the intake means in such manner that the velocity and direction of the stream of by-passed fluid assists the flow of fluid to the intake port from the reservoir.

The invention can be further briefly summarized as consisting in the novel flow director and in certain combinations and arrangements of parts, which are described hereinafter and are particularly set out in the claims hereof.

In the accompanying sheets of drawings:

Fig. 4 is a partial vertical section taken through the pump as indicated by section line 4—4 of Fig. 3 and showing the gear rotors;

Fig. 10 is a top plan view of the modified rotary pump of Fig. 9 and showing the same with the reservoir removed therefrom;

Fig. 12 is a transverse vertical section taken through this modified pump as indicated by section line 12—12 of Figs. 10 and 11;

Fig. 14 is a fragmentary section taken through the flow directing means of the modified pump as indicated by section line 14—14 of Fig. 12.

Figure 1:
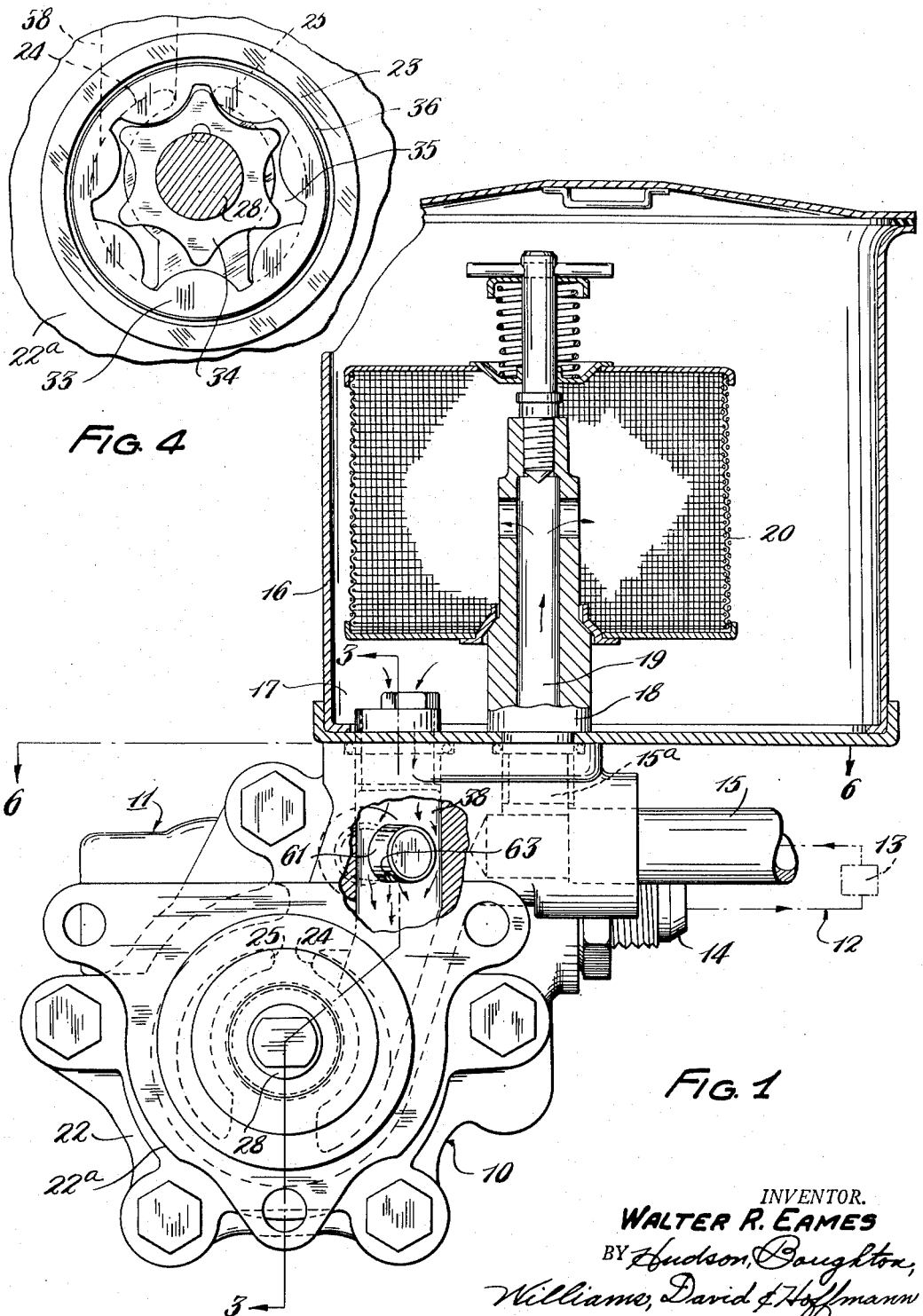
Fig. 1 is an end view of a rotary pump embodying the flow directing means of this invention and showing the pump as forming a part of a pumping unit which includes a reservoir, portions of the pump and reservoir being shown in vertical section.
Figure 2:
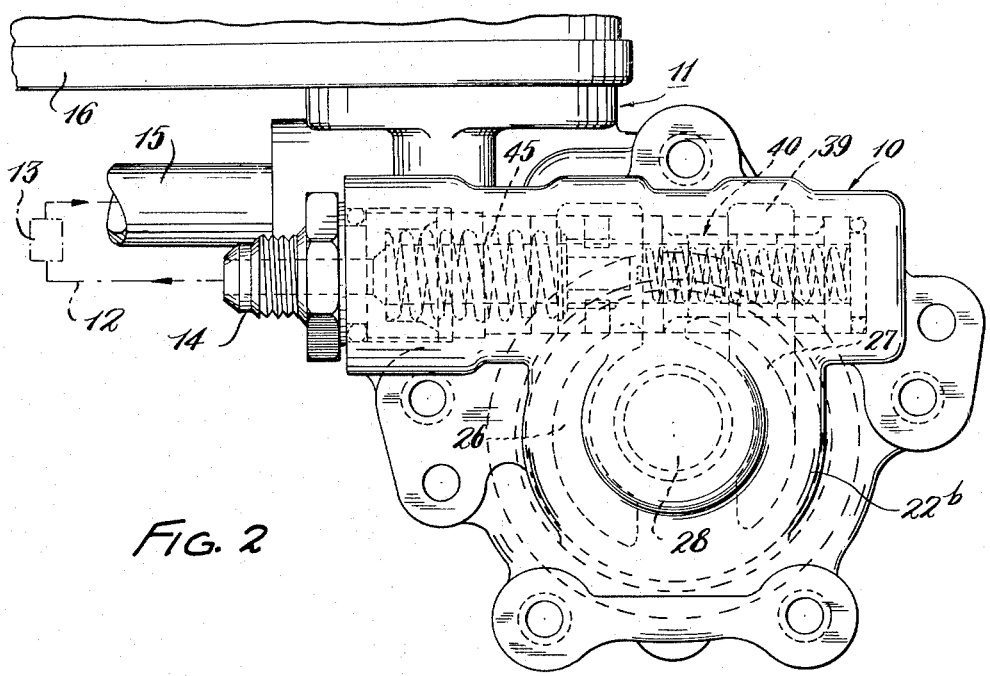
Fig. 2 is an end view of the same pumping unit as seen from the opposite end of the pump.

In proceeding with the detailed description of this invention, reference will first be made to Figs. 1 to 6 inclusive which show a rotary pump 10 embodied in and forming a part of a pumping unit 11 which supplies hydraulic fluid under pressure to a closed-loop external fluid circuit 12. The external fluid circuit 12 includes an auxiliary or accessory device which is operated by the hydraulic pressure being supplied by the pump 10 and may be a hydraulic power steering device 13 which is here shown only diagrammatically. The external fluid circuit also includes delivery and return conduit members 14 and 15 by which the rotary pump 10 is operably connected with such circuit.

The pumping unit 11 also includes a reservoir member 16 which is mounted on and supported directly by the rotary pump 10 and defines a reservoir chamber 17 adapted to contain a quantity of the hydraulic fluid. A fitting 18 extending into the reservoir 16 has an axial passage 19 through which fluid being returned from the external circuit 12 is supplied to the reservoir chamber 17. The fitting 18 also forms a support for a substantially cylindrical strainer 20 which is disposed around this fitting and through which the returned fluid must pass in flowing into the reservoir chamber.

The rotary pump 10 is provided with a pump housing 22 which is formed by a pair of connected housing sections 22$^a$ and 22$^b$. The housing section 22$^a$ comprises a body member having a rotor chamber 23 therein. The housing section 22$^a$ is also provided with a pair of arcuately extending intake and discharge ports 24 and 25 which communicate with the rotor chamber 23 at one end thereof. The discharge port 25 is in the form of an arcuate pocket which can be conveniently referred to as a blind pocket inasmuch as this pocket does not have any intake or discharge passage connected therewith but communicates only with the pumping chambers 35. The housing section 22b forms a cover for the rotor chamber 23 and contains a pair of arcuately extending intake and discharge ports 26 and 27 which communicate with the rotor chamber 23 at the opposite end thereof.

Figure 3:
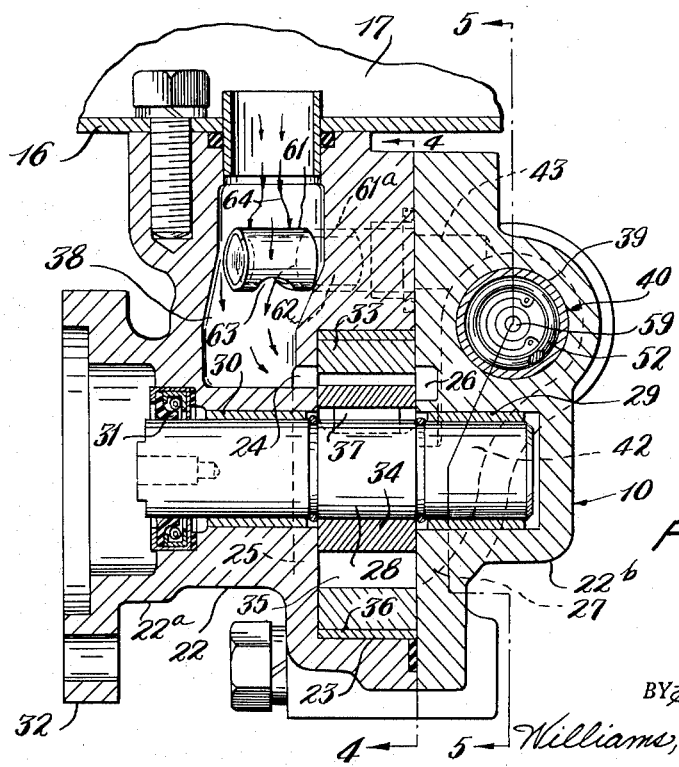
Fig. 3 is a vertical section taken through the pump substantially as indicated by section line 3—3 of Fig.1.

The rotary pump 10 also includes a shaft 28 having its outer end rotatably supported in the housing section 22b by a bushing 29 mounted in the latter. The inner end of the shaft 28 is rotatably supported by a bushing 30 mounted in the housing section 22a. As shown in Fig. 3, the inner end of the shaft projects beyond the bushing 30 and also extends through an annular packing 31 which is mounted in the housing section 22a adjacent the bushing. The inner end of the shaft 28 is adapted for connection with an available rotating part from which the rotary pump is to be driven. The housing section 22a is provided with a flange 32 adapted for connection with an available support on which the rotary pump 10 is to be mounted.

The pump 10 also includes rotor means operable in the rotor chamber 23 for producing a pumping action and which rotor means comprises a pair of outer and inner rotor members 33 and 34. These rotor members have toothed portions in cooperating meshing engagement for defining variable pumping chambers 35 therebetween and which pumping chambers come into communication with the intake and discharge ports in succession. The outer rotor member 33 is rotatably supported by a cylindrical liner or bushing 36 mounted in the rotor chamber 23. The inner rotor member 34 is mounted on the shaft 28 and is connected therewith by the key 37.

The housing section 22a is provided with an intake passage 38 extending in depending relation from the reservoir chamber 17 and which connects the reservoir chamber with the intake port 24. The intake passage 38 has substantially continuous side wall means such as to confine therein the intake fluid being supplied to the intake port 24 through this passage. The housing section 22a is also provided with a return fluid passage 15a which connects the return conduit 15 of the external fluid circuit with the passage 19 leading into the reservoir chamber 17. The housing section 22b is provided with a valve chamber 39 which extends in spanning relation to the intake and discharge ports 26 and 27 of this housing member and which contains a by-pass valve assembly 40 which will be further described presently.

Figure 5:
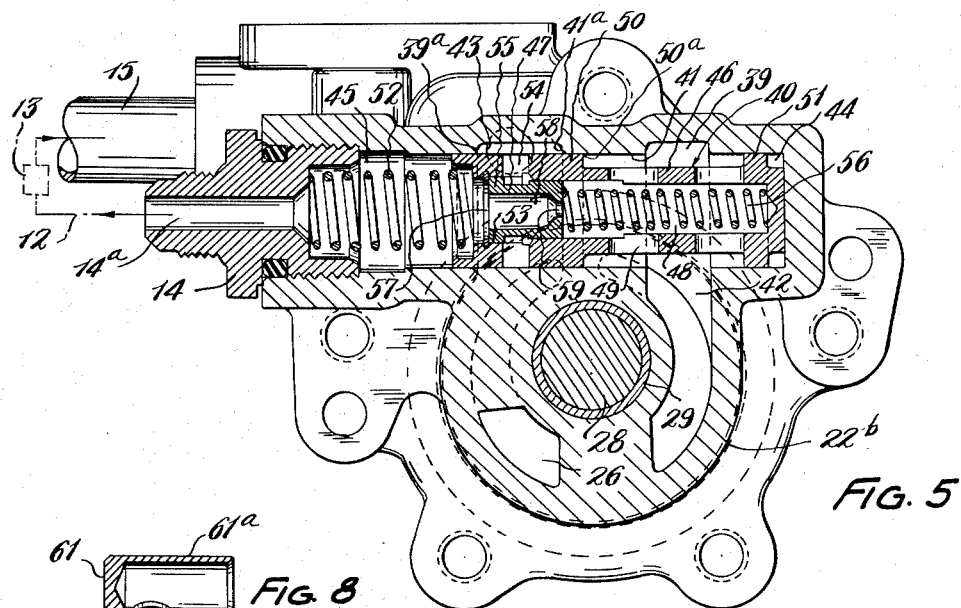
Fig. 5 is another vertical section taken through the pump substantially on section line 5—5 of Fig. 3 and showing the control valve means.
Figure 8:
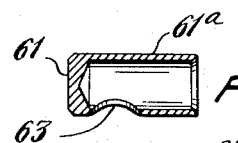
Fig. 8 is a longitudinal section taken through the flow directing insert on section line 8—8 of Fig. 7.
Figure 7:
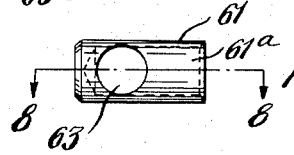
Fig. 7 is an elevation showing the flow directing insert in detached relation.
Figure 6:
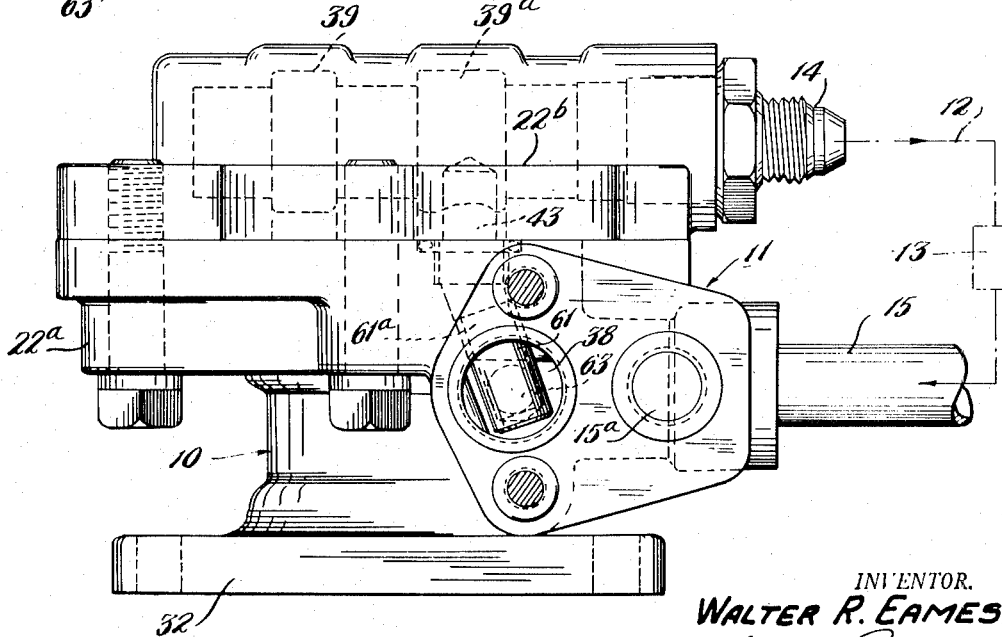
Fig. 6 is a top plan view of the pump showing the same with the reservoir removed therefrom.
Figure 9:
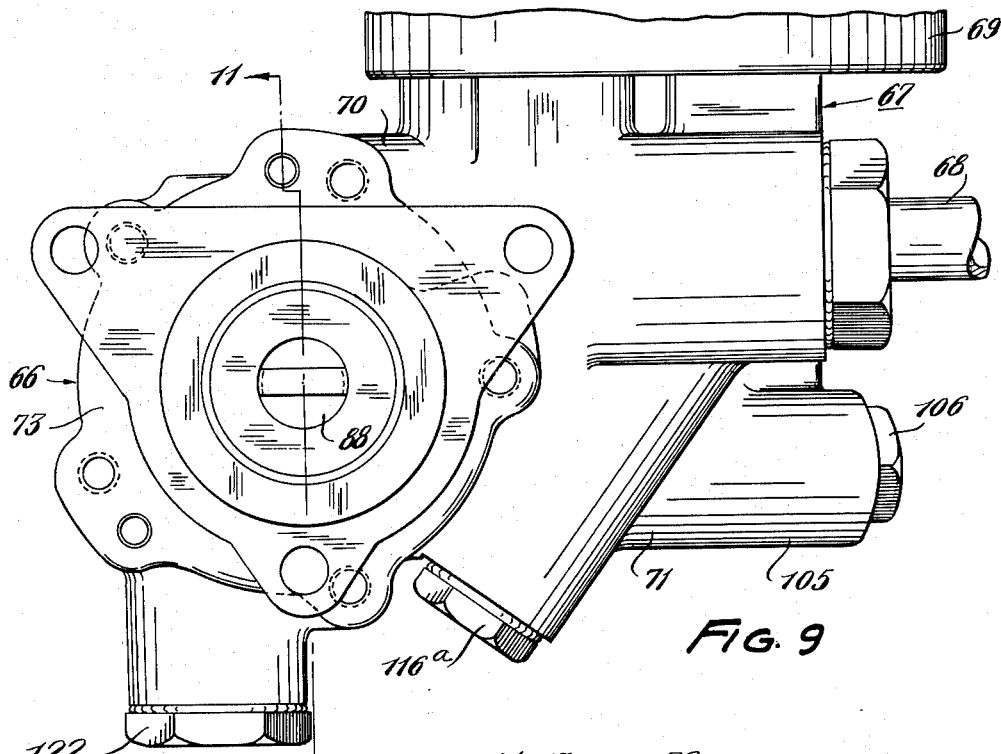
Fig. 9 is an end view showing a modified form of rotary pump embodying the flow directing means of this invention and also showing the pump as forming a part of a pumping unit which includes a reservoir.

As shown in Fig. 5, the valve chamber 39 is provided at an intermediate point thereof with an internal annular valve seat 41. Inwardly of the valve seat 41 this valve chamber is in communication with the discharge port 27 through a connecting passage 42. A portion 39a of this valve chamber which is located outwardly of the valve seat 41, is in communication with a by-pass passage 43 through which by-pased fluid is returned to the intake side of the pump in a manner to be explained hereinafter. The extreme inner end portion of the valve chamber 39 defines a dash pot cylinder 44. The extreme outer end portion of the valve chamber 39 defines a delivery passage 45 through which the pumped fluid being supplied to the external fluid circuit 12 is delivered. The outer end of the valve chamber is closed by the fitting or conduit member 14 which has a passage 14a therein connecting the delivery passage 45 with the external fluid circuit.

The valve assembly 40 is operable in the valve chamber 39 as a by-pass valve means which controls the flow of by-passed fluid from the valve chamber through the passage 43. This valve assembly comprises a volume control valve member 46 and a pressure relief valve member 47. The volume control valve member 46 is a hollow valve member having an axial passage 48 therein and also having radial ports 49 through which the axial passage is connected with the discharge port 27. At an intermediate point thereof, the valve member 46 is provided with a valve plunger portion 50 which cooperates with the valve seat 41. At its inner end, the valve member 46 is provided with a dash pot plunger 51 which is operable in the dash pot cylinder 44. A compression spring 52, located in the delivery passage 45 and disposed between the fitting 14 and the outer end of the valve member 46, acts on this valve member tending to shift the same in a direction to cause closing movement of the valve plunger portion 50 in relation to the valve seat 41.

At a point adjacent its outer end, the axial passage 48 of the volume control valve member 46 is provided with an internal annular valve seat 53. The volume control valve member 46 is also provided with radial by-pass ports 54 adjacent this internal valve seat 53 and which are continuously in communication with the valve chamber portion 39a.

The pressure relief valve member 47 is slidable in the outer end portion of the axial passage 48 of the valve member 46 and includes a valve plunger portion 55 which cooperates with the internal annular valve seat 53. A compression spring 56 located in the axial passage 48 of the valve member 46 acts on the pressure relief valve member 47 and urges the same in an outward direction to a position engaging the valve seat 53 for closing the by-pass ports 54.

A spring ring 57 mounted in the valve member 46 retains the pressure relief valve member 47 in the axial passage 48 and forms a stop against which the pressure relief valve member is adapted to be held by the compression spring 56. The pressure relief valve member 47 has an axial passage 58 therein which includes a flow control orifice 59. The axial passage 58 and the flow control orifice 59 connect the delivery passage 45 with the discharge port 27 through the axial passage 48 and the radial openings 49 of the valve member 46.

The valve assembly 40 is more fully disclosed and claimed in copending patent application Serial No. 261,655 filed December 14, 1951. For the purposes of the present invention, it is sufficient to explain that the valve assembly 40 is responsive to the pressure of the spring 52 and the fluid pressure differential across the orifice 59. When the pump 10 is being driven at a relatively high rate of speed, the resultant effect of these pressures causes the valve assembly 40 to be shifted toward the left in opposition to the spring 52 to thereby move the edge 50a of the valve plunger portion 50 past the shoulder 41a of the internal valve seat 41 to thereby cause opening of the volume control valve member 46 for by-passing pumped fluid from the discharge port 27 to the by-pass passage 43 for return to the intake side of the pump. The amount of fluid which is thus by-passed for return to the intake side of the pump is dependent upon the extent of this opening movement of the valve member 46 and will be such that the rate at which pumped fluid will be supplied to the external fluid circuit 12 through the delivery passage 45 will be automatically maintained at a desired substantially constant value.

The pressure relief valve member 47 is responsive to the pressure of the spring 56 and to the fluid pressures acting on opposite ends of this valve member. When the pump 10 is being operated at the relatively high speed mentioned above, the resultant effect of these forces causes the pressure relief valve member 47 to be shifted towards the right in opposition to the spring 56 to cause an opening movement of the valve plunger portion 55 relative to the by-pass ports 54 for by-passing pumped fluid from the delivery passage 45 to the by-pass passage 43 for return to the intake side of the pump. The amount of fluid thus by-passed through the by-pass ports 54 will depend upon the extent of this opening movement of the pressure relief valve member 47 and will be such that the pressure of the fluid being supplied to the external fluid circuit 12 will be automatically maintained at a desired substantially constant pressure value.

In accordance with the present invention, the pumped fluid which is by-passed through the passage 43 by the functioning of the valve members 46 and 47 is returned to the intake side of the pump in a novel manner which will now be described and by which turbulence in the intake fluid and noise resulting therefrom will be prevented or kept at a minimum, and also by which the velocity of the by-passed fluid can be used to assist the flow of intake fluid to the intake port 24. The by-pass passage 43 accordingly extends between and connects the valve chamber 39 and the intake passage 38.

In utilizing the by-passed fluid for the purposes just mentioned above, the present invention also provides a flow directing means in the pump housing 22 by which the by-passed fluid is directed into the intake passage 38. This flow directing means is preferably in the form of an insert 61 located in the housing section 22ᵃ. The insert 61 is here shown as having a sleeve portion 61ᵃ at one end thereof which is engaged in the by-pass passage 43 for mounting the insert in the housing section 22ᵃ. An axial passage 62 of the insert forms a continuation of the by-pass passage 43.

The other end of the insert 61 projects from the by-pass passage 43 so as to extend into the intake passage 38 and is provided with a delivery opening or nozzle orifice 63 in the side thereof facing toward the intake port 24. The portion of the insert 61 which extends into the intake passage 38 is of a smaller outside transverse dimension than the internal transverse dimension of the intake passage such that the fluid flowing to the intake port 24 from the reservoir chamber 17 can flow past the insert on opposite sides thereof as indicated by the directional arrows 64.

The by-passed fluid flows through the axial passage 62 of the insert 61 and is then discharged as a velocity stream through the delivery opening 63. Because of the location of the delivery opening 63, this velocity stream will be projected into the intake passage 38 in a downstream direction, that is to say, in a direction moving toward the intake port 24. This velocity discharge of the by-passed fluid into the intake passage 38, taking place in the same direction as that in which intake fluid from the reservoir chamber 17 is flowing to the intake port 24, will result in a confluence or mingling of these fluid streams with minimum disturbance or turbulence therein.

Moreover, the velocity discharge of the by-passed fluid through the opening 63 of the insert will be in a direction to assist the movement of intake fluid from the reservoir chamber 17 and will tend to drive such intake fluid into the intake port 24 thereby assisting in always maintaining the intake port substantially filled and thus avoiding the occurrence of a temporary vacuum condition in the intake port. Because of the elimination of turbulence in the fluid of the intake passage and the prevention of a vacuum condition in the intake port by the action of the flow directing insert 61, the occurrence of objectionable noises in the pump 10 at this point will be minimized or substantially eliminated.

Figs. 9 to 13 inclusive of the drawings show a modified form of rotary pump 66 embodied in and forming a part of a pumping unit 67 which supplies hydraulic fluid under pressure to a closed-loop external circuit for actuating a power steering device or the like located in such external circuit. The external fluid circuit is here represented only by the delivery conduit 68 by which the circuit is connected with the rotary pump 66. The pumping unit 67 also includes a reservoir 69 mounted directly on the rotary pump 66 and adapted to contain a quantity of the hydraulic fluid. A return conduit (not shown) forming a part of the external fluid circuit is connected with the chamber of the reservoir 69 for returning the hydraulic fluid thereto.

Figure 11:
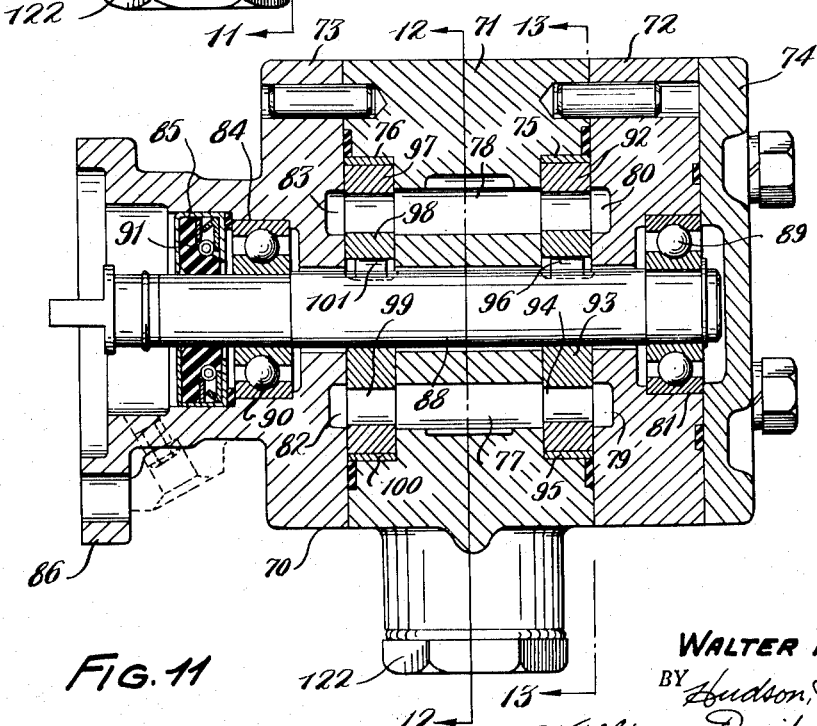
Fig. 11 is a longitudinal vertical section taken through this modified rotary pump as indicated by section line 11—11 of Fig. 9.
Figure 13:
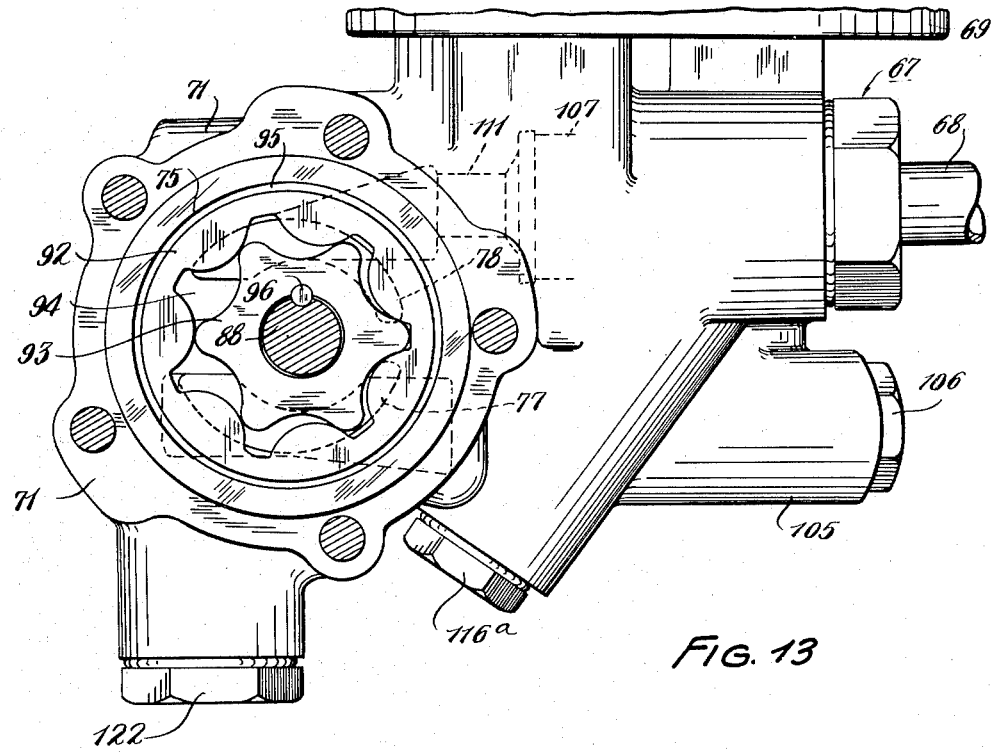
Fig. 13 is another transverse vertical section of the modified pump taken substantially on section line 13—13 of Fig. 11 and showing one pair of the meshing gear rotors.
Figure 15:
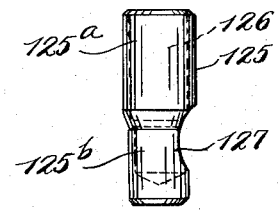
Figs. 15 and 16 are side and front elevations respectively of the flow directing insert of the modified pump and showing such insert in detached relation.
Figure 16:
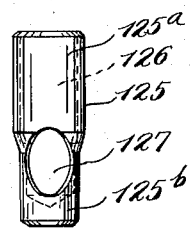

The rotary pump 66 is provided with a pump housing 70 which comprises a plurality of connected housing sections 71, 72 and 73 and a cover member 74. The housing section 71 is an intermediate housing section which is provided with a pair of rotor chambers 75 and 76 disposed in an axially spaced substantially parallel relation to each other. This intermediate housing section 71 is also provided with a pair of arcuately extending intake and discharge ports 77 and 78 which are common to the two rotor chambers 75 and 76 and have their opposite ends in communication with the adjacent ends of these rotor chambers as is shown in Fig. 11.

The outer housing section 72 forms a cover for the rotor chamber 75 and has a pair of arcuately extending intake and discharge pockets 79 and 80 therein which communicate with the rotor chamber 75 at the outer end thereof. The outer housing section 72 also has a bearing chamber 81 therein which is closed by the cover member 74.

The inner housing section 73 forms a cover for the rotor chamber 76 and is provided with a pair of arcuately extending intake and discharge pockets 82 and 83 which communicate with this rotor chamber at the inner end thereof. The housing section 73 is also provided with a pair of adjacently located bearing and sealing chambers 84 and 85 and with a flange 86 adapted for connection with an available support on which the pump 66 is to be mounted.

The rotary pump 66 also includes a shaft 88 extending through the rotor chambers 75 and 76. The outer end of the shaft 88 is rotatably supported by an antifriction bearing 89 which is located in the bearing chamber 81 of the housing section 72. The inner end of the shaft is rotatably supported by an antifriction bearing 90 which is mounted in the bearing chamber 84 of the housing section 73. The inner end of the shaft also extends through and is sealed by an annular packing 91 located in the sealing chamber 85. The inner end of the shaft 88 is adapted for connection with an available rotatable part of the vehicle power plant from which the rotary pump 66 is to be driven.

The pump 66 also includes rotor means operable in the rotor chamber 75 for producing a pumping action and which rotor means comprises a pair of outer and inner rotor members 92 and 93 having toothed portions in meshing cooperation and defining variable pumping chambers 94. The pumping chambers 94 come into communication in succession with the intake and discharge ports 77 and 78 and with the intake and discharge pockets 82 and 83. The outer rotor member 92 is supported by a bushing or liner 95 mounted in the rotor chamber 75. The inner rotor member 93 is mounted on the shaft 88 and is connected therewith by a key 96.

The rotary pump 66 is also provided with rotor means which is operable in the rotor chamber 76 for producing a similar pumping action therein and which rotor means comprises outer and inner rotor members 97 and 98 having toothed portions in cooperating relation and defining variable pumping chambers 99 therebetween. The pumping chambers 99 come into registration in succession with the intake and discharge ports 77 and 78 and with the intake and discharge pockets 79 and 80. The outer rotor member 97 is supported by a bushing or liner 100 mounted in the rotor chamber 76. The inner rotor member 98 is supported by the shaft 88 and is connected therewith by a key 101.

The intermediate housing section 71 is provided with intake passage means for supplying intake fluid from the reservoir 69 to the common intake port 77 and which passage means is here shown as comprising a passage portion 103 extending downwardly from the reservoir and a lateral passage portion 104 forming a continuation of the downward passage portion 103 and connecting the latter with the intake port. The lateral passage portion 104 is formed, in part, in a boss 105 of the intermediate housing section 71 and after the formation of this lateral passage portion in the intermediate housing section, the outer end thereof is closed by means of a plug 106. The intake passage means is provided with substantially continuous side wall means such as to confine in this passage means the fluid being supplied therethrough to the intake port 77.

With respect to the pair of intake and discharge pockets 79 and 80 formed in the outer housing member 72 and the pair of intake and discharge pockets 82 and 83 formed in the inner housing member 73, it should be explained that these intake and discharge pockets can be conveniently referred to as blind pockets inasmuch as they do not have any intake or discharge passages connected directly therewith, but communicate only with the respective pumping chambers 94 and 99.

The intermediate housing section 71 is also provided with a pair of valve chambers 107 and 108 in which are located respectively a volume control valve member 109 and a pressure relief valve member 110. These valve members operate to by-pass pumped fluid from the discharge ports 78 to the intake port 77 for automatically maintaining the volume and pressure values of the pump delivery substantially constant, as will be further explained presently.

The valve chamber 107 has its inner end connected with the discharge port 78 to receive pumped fluid therefrom through the connecting passage 111. The outer end portion of the valve chamber 107 forms a delivery passage 112 through which pumped fluid is delivered to the supply conduit 68 of the external fluid circuit. The conduit 68 is connected with the intermediate housing section 71 by means of a bushing 113 mounted in the outer end of the delivery passage 112.

At an intermediate point thereof the valve chamber 107 is provided with an internal annular valve seat 114. Adjacent to the valve seat 114, but outwardly thereof, the valve chamber 107 is provided with a by-pass port 115 which communicates with a by-pass passage 116 leading to the lateral intake passage 104.

The volume control valve member 109 comprises a valve plunger portion 117 which cooperates with the valve seat 114 for controlling communication between the valve chamber 107 and the by-pass port 115. A compression spring 118 is located in the delivery passage portion 112 of the valve chamber and is disposed between the valve member 109 and the bushing 113. The spring 118 urges the valve member 109 toward the left as seen in Fig. 12, that is, toward a position of closed engagement of the valve plunger portion 117 with the valve seat 114.

The valve member 109 is also provided with a flow control orifice 119 through which the delivery passage 112 is connected with the discharge port 77. The effective areas of the opposite ends of the valve member 109 which are exposed to the fluid pressures in the discharge port 77 and in the delivery passage 112 are substantially equal, such that this valve member is responsive to the resultant effect of the fluid pressure differential across the orifice 119 and the pressure of the spring 118.

When the pump 66 is being driven at a relatively high speed, the volume of pumped fluid being delivered to the discharge port 78 from the rotor chambers will be in excess of that required by the external fluid circuit and the resultant effect of the pressure differential across the orifice 119 and the pressure of the spring 118 will produce an outward movement of the valve member 109 in opposition to the spring. This outward movement of the valve member 109 will cause the annular edge 117ª of the valve plunger portion 117 to move past the annular edge 114ª of the valve seat 114 to establish communication between the discharge port 78 and the by-pass port 115. Pumped fluid will thereupon be by-passed from the discharge port 78 to the intake passage portion 104 through the by-pass port 115 and the by-pass passage 116. The amount of fluid thus being by-passed will depend upon the extent of the opening movement of the valve member 109 and will be such that the rate of delivery of pumped fluid into the supply conduit 68 of the external fluid circuit will be automatically maintained at a desired substantially constant value.

The pressure relief valve chamber 108 extends into the intermediate housing section 71 in spanning relation to the intake and discharge ports 77 and 78. At an intermediate point thereof the valve chamber 108 is provided with an internal annular valve seat 120. Inwardly of the valve seat 120, the valve chamber 108 is in communication with the discharge port 78 and outwardly of this valve seat the valve chamber is in communication with the intake port 77. The outer end of the valve chamber 108 forms a spring chamber 121 which is closed at its outer end by a plug 122. A compression spring 123 located in the spring chamber 121 is disposed between the plug 122 and the outer end of the pressure relief valve member 110.

The pressure relief valve member 110 is provided with a valve plunger portion 124 which cooperates with the valve seat 120 for controlling by-pass communication through the valve chamber between the discharge port 78 and the intake port 77. The spring 123 urges the valve member 110 in an inward direction of the valve chamber 108, that is to say, toward a position of closed engagement of the valve plunger portion 124 with the valve seat 120.

When the pump 66 is being driven at a relatively high speed, as mentioned above, the pressure of the pumped fluid in the discharge port 78 is in excess of the fluid pressure required in the external fluid circuit and the valve member 110 will thereupon be shifted in opposition to the spring 123 and in a direction to cause opening of the valve plunger portion 124 relative to the valve seat 120. Communication is thereby established from the discharge port 78 to the intake port 77 through the valve chamber 108 and the amount of pumped fluid which will be by-passed by the valve member 110 will depend upon the extent of such opening movement of this valve member and will cause the pumped fluid being supplied to the external fluid circuit to be automatically maintained at substantially the desired pressure value.

An important feature embodied in the rotary pump 66 is the provision of a flow directing means for returning the fluid which is by-passed by the volume control valve member 109 to the intake passage means in such a manner that minimum turbulence will be created in the intake fluid and also in a manner such that the velocity of the by-passed fluid can be utilized to assist the flow of intake fluid to the intake port 77 for maintaining the latter filled with intake fluid and for preventing the formation of a vacuum condition in such intake port.

In utilizing the by-passed fluid for this purpose, the invention provides a flow directing insert 125 which is mounted in the intermediate housing section 71 by having the sleeve portion 125ª engaged in the by-pass passage 116. The insert 125 also has an end portion 125ᵇ which projects into the lateral intake passage portion 104. This insert is provided with an axial passage 126 which receives the by-passed fluid from the by-pass passage 116 and a delivery opening or nozzle orifice 127 in the projecting end portion 125ᵇ and through which the by-passed fluid is discharged as a velocity stream. The insert 125 can be inserted into the by-pass passage 116 through the outer end thereof after which such outer end of this passage is closed by the plug 116ª.

As shown in Figs. 12 and 14, the insert 125 is disposed with the delivery opening 127 thereof facing in a downstream direction in the passage portion 104, that is to say, facing toward the intake port 77. The projecting portion 125ᵇ of the insert has an outside transverse dimension which is smaller than the inside transverse dimension of the intake passage portion 104, such that the intake fluid can flow freely past the insert in divided stream portions as is indicated by the directional flow arrows 128 in Fig. 14.

The discharge of the by-passed fluid into the intake passage portion 104 in the downstream direction will permit the by-passed fluid to unite and mingle smoothly with the stream of intake fluid with minimum turbulence or disturbance, and hence, with minimum noise resulting therefrom. The delivery of the by-passed fluid into the intake passage portion 104 in a direction toward the intake port 77 as a velocity stream, will assist the flow of intake fluid and will cause the intake port to be always maintained filled with intake fluid to thereby counteract any tendency toward the creation of a vacuum condition in the intake port.

In the embodiments of the pumping unit disclosed herein the flow directing means is shown as being in the form of a hollow insert, but the invention also contemplates a construction in which the flow directing means is otherwise formed, as by means of a portion of the pump housing having a delivery passage or nozzle orifice therein. As is apparent from the drawings and the foregoing detailed description, the pumps 10 and 66 are positive-displacement single-pressure-stage pumps.

From the foregoing detailed description and the accompanying drawings, it will now be readily understood that this invention provides novel flow directing means in a positive displacement rotary pump and in a pumping unit embodying such a rotary pump, by which fluid being by-passed from the discharge side of the pump to the intake side thereof can be mingled smoothly and with minimum turbulence and noise with the stream of intake fluid. Likewise it will be seen that this novel flow directing means also provides for utilizing the by-passed fluid as a velocity stream for assisting the flow of intake fluid to the intake port for maintaining the latter substantially filled at all times and preventing the formation of a vacuum condition therein, and for utilizing the energy of the high velocity by-passed fluid for increasing the pressure head of the intake fluid at points downstream from the junction point of the by-passed fluid with the stream of intake fluid. Additionally, it will be now understood that this flow directing means can be employed in the form of an insert adapted to be mounted in the pump housing with a portion of the insert projecting into the intake passage means and provided with a nozzle opening facing toward the intake port.

Although the flow directing means of the present invention, and the rotary pumps and pumping units embodying the same, have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a pumping unit of the character described, a housing having therein a rotor chamber and intake and discharge ports communicating with said rotor chamber, said housing also having an intake passage therein communicating with said intake port and adapted to be supplied with intake fluid, rotor means operable in said rotor chamber for producing a pumping action, and means for by-passing pumped fluid from said discharge port to said intake passage including a flow directing insert mounted in said housing, said insert comprising a hollow stem portion adapted to receive the by-passed fluid and a nozzle portion carried by said stem portion and extending into said intake passage transversely thereof, said nozzle portion being smaller in its transverse external dimension than the transverse internal dimension of said intake passage and having a discharge opening facing downstream with respect to the direction of fluid flow in said intake passage.

2. In a pumping unit, a positive-displacement single-pressure-stage pump comprising a pump housing having therein a rotor chamber and rotor means operable in said chamber, said housing having intake and discharge ports communicating with said rotor chamber, said housing also having an intake passage therein leading to the intake port for supplying fluid to the latter and having substantially continuous side wall means confining the fluid being supplied to said intake port, said housing additionally having a by-passed passage adapted to receive fluid from the discharge port as by-pass fluid and junctioning with said intake passage through said side wall means of the latter at a point upstream from said intake port, a substantially straight tubular insert having one end thereof engaged in one of said passages to receive the full stream of the fluid in said one passage and a projecting delivery end disposed in said intake passage in spaced relation to said side wall means, and flow directing means on said delivery end for directing the by-pass fluid entering said intake passage in a downstream direction of the latter, said insert including said flow directing means defining a permanently open communicating connection between said by-pass passage and said intake passage.

3. In a pumping unit, a housing having therein a rotor chamber and intake and discharge ports communicating with said rotor chamber, means defining a reservoir chamber supported directly by said housing at an elevation above said rotor chamber, said housing also having an intake passage therein leading from said reservoir to the intake port for supplying fluid to the latter and said intake passage having substantially continuous side wall means confining the fluid being supplied to said intake port, said housing additionally having a by-pass passage adapted to receive fluid from the discharge port as by-pass fluid and junctioning with said intake passage through said side wall means of the latter at a point upstream from said intake port, a substantially straight tubular insert having one end thereof engaged in one of said passages to receive the full stream of the fluid in said one passage and a projecting delivery end disposed in said intake passage in spaced relation to said side wall means, and flow directing means on said delivery end for directing the by-pass fluid entering said intake passage in a downstream direction of the latter.

4. A pumping unit as defined in claim 3 in which said pump housing has a pair of rotor chambers therein with rotor means operable in each rotor chamber and said pump housing includes an intermediate housing section between the rotor chambers and having said intake passage and said by-pass passage formed therein, and in which said insert is mounted in said intermediate housing section such that said insert and the flow directing means thereof define a permanently open communicating connection between said by-pass passage and said intake passage.

References Cited in the file of this patent

UNITED STATES PATENTS

| | | |
|---|---|---|
| 1,760,070 | Kinsella | May 27, 1930 |
| 2,085,982 | Johnson | July 6, 1937 |
| 2,219,488 | Parker | Oct. 29, 1940 |
| 2,271,826 | Mercier | Feb. 3, 1942 |
| 2,279,176 | Pardee | Apr. 7, 1942 |
| 2,316,445 | Marshall | Apr. 13, 1943 |
| 2,380,606 | Moody | July 31, 1945 |
| 2,446,730 | Wemp | Aug. 10, 1948 |
| 2,466,812 | Jacobsen | Apr. 12, 1949 |